Sept. 29, 1959 M. L. MATTHEWS 2,906,530
FEEDING AND STACKING METHOD AND MACHINE
Filed Jan. 24, 1957 12 Sheets-Sheet 1

*Fig. 1*

INVENTOR.
MERTON L. MATTHEWS
BY Rines and Rines
ATTORNEYS

Fig. 1-A

Sept. 29, 1959　　　M. L. MATTHEWS　　　2,906,530
FEEDING AND STACKING METHOD AND MACHINE
Filed Jan. 24, 1957　　　　　　　　　　12 Sheets-Sheet 4

Fig. 3

INVENTOR.
MERTON L. MATTHEWS
BY Rines and Rines
ATTORNEYS

Fig. 4

INVENTOR.
MERTON L. MATTHEWS
BY Rines and Rines
ATTORNEYS

Sept. 29, 1959   M. L. MATTHEWS   2,906,530
FEEDING AND STACKING METHOD AND MACHINE
Filed Jan. 24, 1957   12 Sheets-Sheet 7

INVENTOR.
MERTON L. MATTHEWS
BY Rines and Rines
ATTORNEYS

Sept. 29, 1959 M. L. MATTHEWS 2,906,530
FEEDING AND STACKING METHOD AND MACHINE
Filed Jan. 24, 1957 12 Sheets-Sheet 11

INVENTOR.
MERTON L. MATTHEWS
BY Rines and Rines
ATTORNEYS

Sept. 29, 1959     M. L. MATTHEWS     2,906,530
FEEDING AND STACKING METHOD AND MACHINE
Filed Jan. 24, 1957     12 Sheets-Sheet 12

INVENTOR.
MERTON L. MATTHEWS
BY Rines and Rines
ATTORNEYS

United States Patent Office 2,906,530
Patented Sept. 29, 1959

2,906,530

FEEDING AND STACKING METHOD AND MACHINE

Merton L. Matthews, Westerly, R.I., assignor to Maxson Automatic Machinery Company, Westerly, R.I., a corporation of Rhode Island Application January 24, 1957, Serial No. 636,053

34 Claims. (Cl. 271—88)

The present invention relates to feeding and stacking methods and machines, and, more particularly, to machines for feeding and stacking sheet material, like paper and paper board.

A machine is described in United States Letters Patent 2,521,075, issued September 5, 1950, to Louis L. Matthews, comprising a plurality of tapes for feeding the sheets into a layboy, where they become stacked upon a main support that is automatically lowered by degrees to maintain the top of the stack of sheets at substantially constant height. In order continuously to operate the machine without shut-down when the main support has become lowered to the floor, completely loaded with stacked sheets, an auxiliary support is provided in the form of a plurality of fingers. These fingers are caused to be extended above the main support in order to receive the sheets temporarily until the loaded main support has become removed and a new main support has been inserted underneath the auxiliary support. This machine has been found to be very satisfactory, in practice.

Upon occasion, however, paper, paper board and the like may have a tendency to slip along the extended fingers of the auxiliary support. In accordance with the invention disclosed in Letters Patent 2,698,176, issued on December 28, 1954 to Merton L. Matthews, an effective means is provided for preventing sheets from slipping laterally along the auxiliary support while the sheets are jogged to align them. Those means may assume the form of preferably planar side-jogging blades each of which is supported with its bottom edge sloping downward and forward and with the forward end of the bottom edge disposed below the upper surfaces of adjacent fingers of the auxiliary support, and the rear end of the bottom edge disposed above the fingers. The inclined jogger blades cannot, however, prevent longitudinal slipping of the sheets. When very light grades of paper stock are employed, furthermore, the stream of sheets tends to double over as it is delivered upon the auxiliary support.

An object of the present invention, accordingly, is to provide a new and improved method of and machine for obviating these difficulties and preventing the sheets from doubling over or becoming misaligned upon the auxiliary or other support.

A further object is to provide a new and improved method and machine that is particularly suited for use with very light grades of paper stock and the like.

When, moreover, the auxiliary support is to be withdrawn, frictional forces may tend to cause the bottom sheet of the stack deposited upon the auxiliary support to adhere to the support. An additional object of the present invention, accordingly, is to provide a new and improved method of and machine for overcoming this further difficulty.

In summary, these results are achieved, in accordance with the invention, by directing air pressure above the support to supply an air cushion that floats the initial oncoming sheet when the fingers are extended. Air pressure is also supplied when the fingers are to be retracted to overcome the frictional forces tending to cause adherence between the bottom sheet of the stack and the support.

Other and further objects will be explained hereinafter and will be more particularly pointed out in the appended claims.

The invention will now be more fully described in connection with the accompanying drawings, in which Figs. 1 and 1A together constitute a diagrammatic view in side elevation, with parts broken away, for clearness, of a papercutting-and-feeding machine embodying the present invention, with Figs. 1 and 1A being joined along the lines A—A, and the fingers constituting the auxiliary support being shown retracted.

The drawings illustrate the before-mentioned paper-sheet-cutting-and-feeding machine of well-known type, such as is commonly employed in paper and paper-board mills, to cut webs from a roll or rolls into sheets, and feeding the sheets by means of more or less horizontal conveyor tapes, into a lay-boy.

A web 32 is fed from a paper roll (not shown) of paper to feed rolls 10, by which the paper is advanced to a stationary bed-knife cutter 15. The term "web," "paper," "sheet" or its equivalent, will be employed herein to denote either a single layer or a plurality of superposed layers of the paper or other material. A rotary cutter 16 cooperates with the bed cutter 15 to cut the traveling web into sheets 56 of the desired length. The invention is equally applicable to machines for feeding previously cut sheets.

Owing to the feeding action of the rolls 10, aided by gravity, the sheets 56 travel, at a downward incline, toward a series of cooperating conveyor tapes or belts 2 and 6. The plurality of conveyor tapes or belts 2 and 6 and the rotary cutter 16 are actuated by any desired mechanism 1. The conveyor tapes or belts 6 are disposed approximately horizontal, at a level below the level at which the web 32 is fed between the rolls 10, but they may be inclined slightly upward, to slope toward the lay-boy 4. Together with the bed-knife cutter 15 and other parts of the machine, the tapes or belts 2 and 6 are mounted on a frame 26 to the rear of the lay-boy 4.

Figure 1:
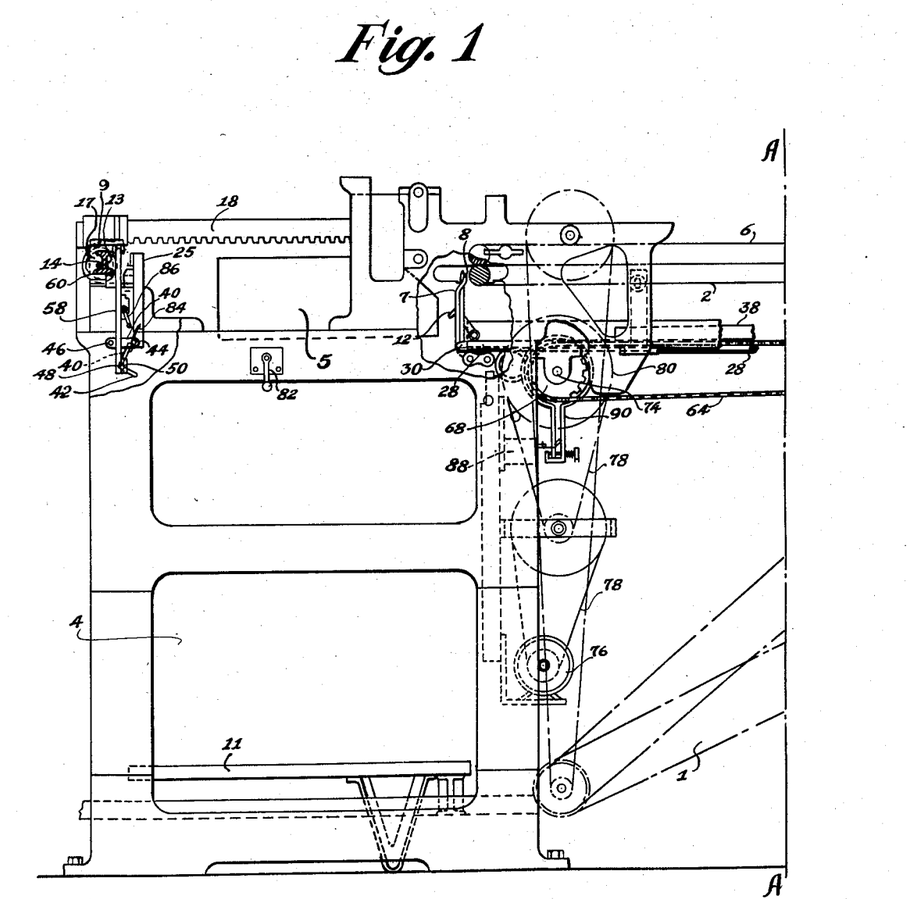
Figure 16:
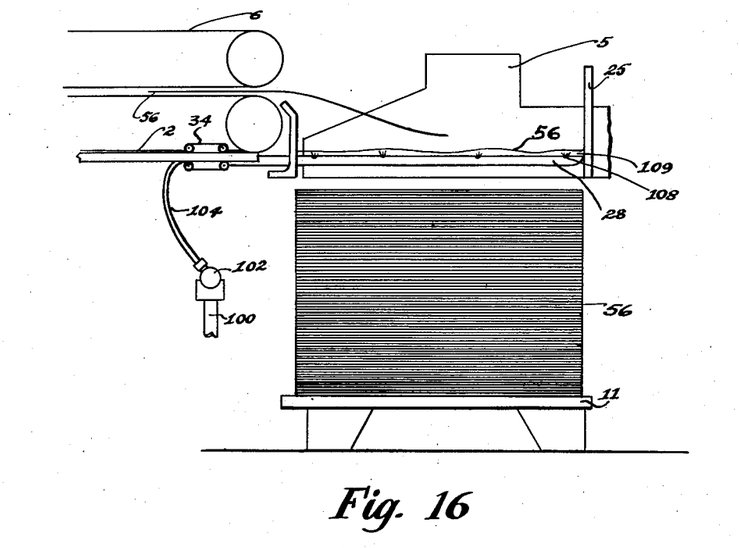
Fig. 16 is a similar view, showing the stack of sheets on the main support completed and the feeding of further sheets on the extended auxiliary fingers pending the removal of the main support with the stack of sheets thereupon, an air cushion being provided for floating the initial sheet or sheets.

The tapes 2 and 6 feed the sheets 56 forward in order to deliver them singly into the lay-boy 4 upon a main skid support or platform 11, for stacking and piling. The tapes 2 and 6 are naturally above the level of the main support 11 in the lay-boy 4. When the rotary cutter 16 and the tapes 2 and 6 start operating, the level of the main skid support or platform 11 has been raised to its highest position just below the tapes 2 and 6 and sheets 56 commence to be stacked thereon. As sheets 56 become stacked on the skid support or platform 11, the platform becomes progressively lowered by degrees, eventually reaching the floor, as shown in Figs. 1 and 16.

In the lay-boy 4, the sheets 56 engage front stops 25, Figs. 1 to 4 and 13, to limit their further forward movement. The sheets are jogged by laterally oscillating side jogger blades 5, in the usual manner. They are preferably slightly downwardly inclined as disclosed in the said Letters Patent 2,698,176, with their forward downwardly inclined portions between or outside the hereinafter described fingers 28. The side jogger blades 5 and rear joggers 7, in combination with stationary fingers 8, assure that the sheets 56 shall be stacked or piled evenly. Constructions for effecting this result are described, for example, in Letters Patents 2,261,972, issued November 11, 1941, and 2,367,416, issued January 16, 1945, to Louis L. Matthews.

Figure 13:
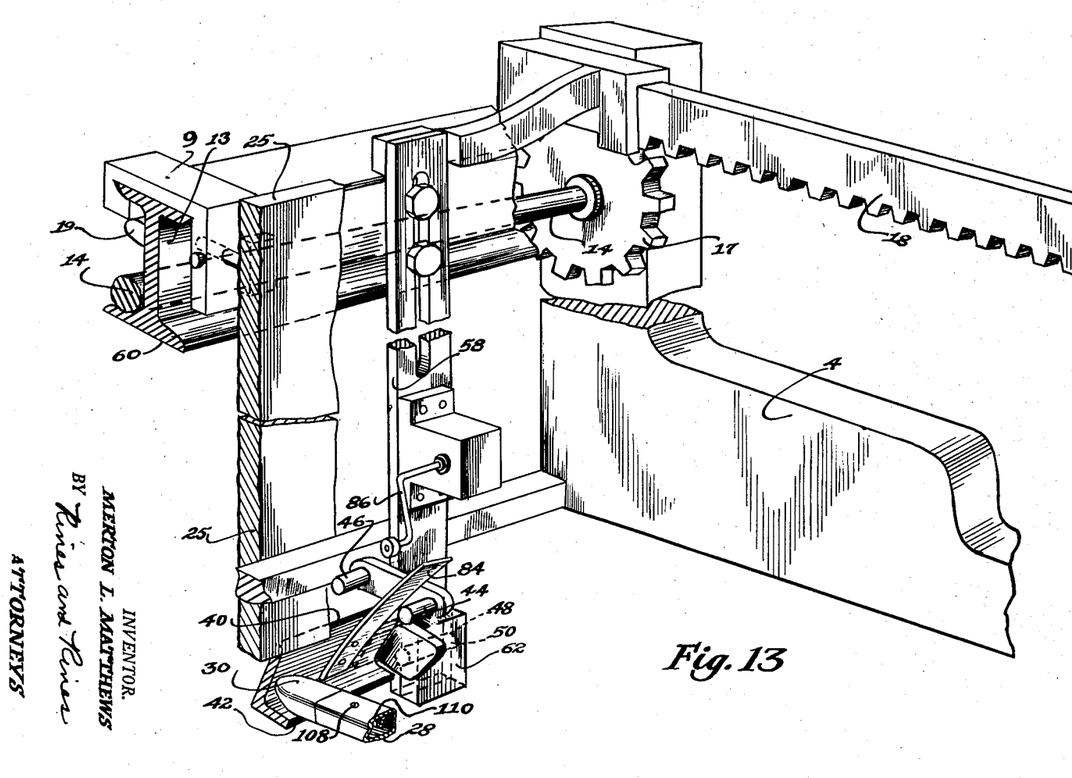
Fig. 13 is a fragmentary perspective, upon a larger scale.

The front stops 25 are illustrated as backboards, as more particularly shown in Fig. 13. As the length of the sheets 56 that may be stacked or piled in the lay-boy 4 is determined by the position of these front-stop backboards 25, they should be adjustable. They are therefore shown carried upon bracket arms 58 that are provided with hooks 9 hooked over the upper arm of a supporting-arm carriage 13, shown as a transversely disposed I-shaped beam. The hooks 9 may be adjustably bolted in place upon the carriage 13 by bolts 19. A similarly transversely disposed shaft 14, the ends of which carry gears 17, is rotatably mounted in this carriage 13, adjacent to the vertically disposed arm of the I beam. Fig. 13 shows the shaft 14, upon a larger scale, resting on the horizontal leg 60 of the I-shaped beam of this carriage 13. The gears 17 mesh with fixed longitudinally disposed racks 18. Rotation of the shaft 14, through the intermeshing arrangement of the gears 17 and the racks 18, will result in adjustment of the carriage 13, 60 lengthwise of the machine, thus effecting corresponding adjustment of the stops 25.

Figure 14:
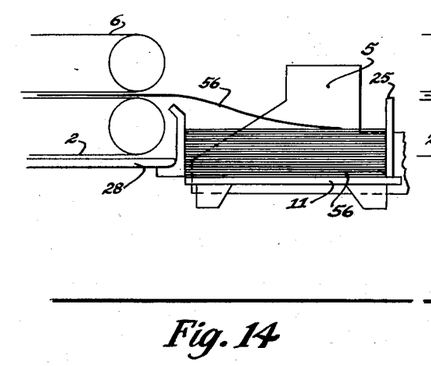
Fig. 14 is a diagrammatic view illustrating the feeding of sheets on to a main support of the lay-boy, the auxiliary supporting fingers being retracted.
Figure 15:
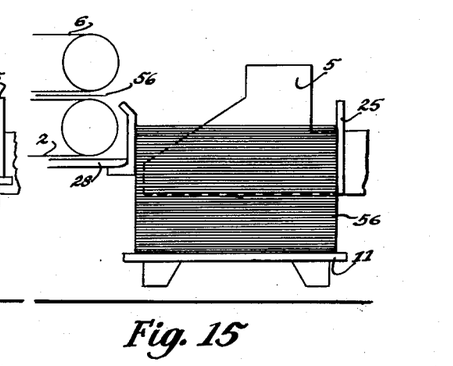
Fig. 15 is a similar view, showing the accumulation of the stack of sheets on the main support, at a later time.
Figure 17:
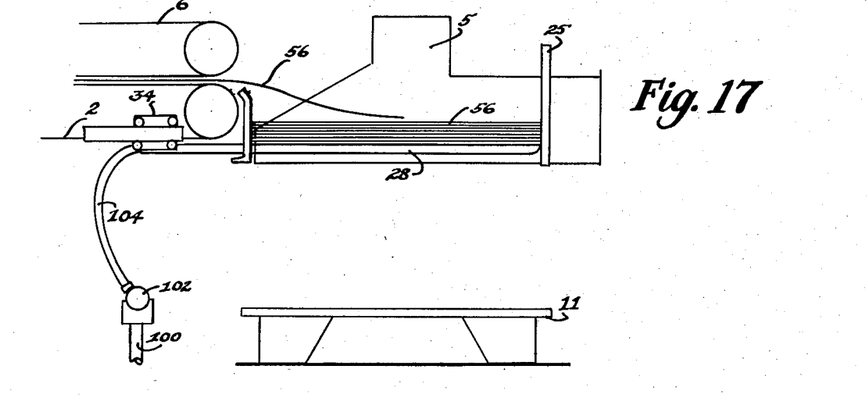
Fig. 17 is a view similar to Fig. 16, showing the main support with the stack of sheets removed and a new empty main support substituted therefor.
Figure 18:
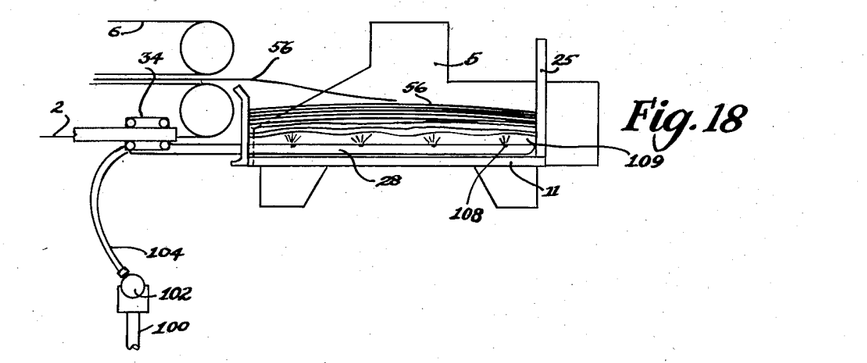
Fig. 18 is a view similar to Fig. 17, showing the substituted main support raised into position ready to receive the sheets temporarily accumulated upon the supporting fingers upon retraction of the supporting fingers, air pressure being applied to prevent adhesion of the bottom sheet of the stack to the supporting fingers.
Figure 19:
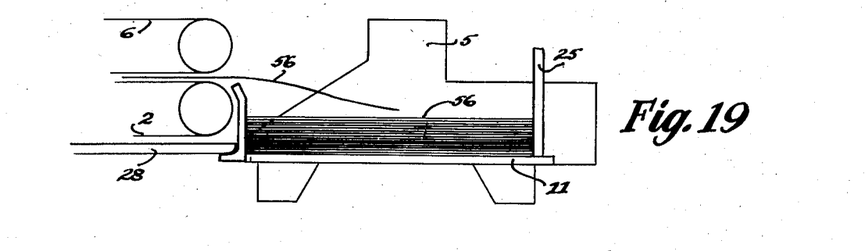
Fig. 19 is a view similar to Fig. 14, illustrating the transfer of the stack temporarily accumulated upon the auxiliary support to the new main support, the fingers of the auxiliary support being retracted again.

As before stated, the main skid support or platform 11 is initially raised to a level just below that of the delivery tapes 2 and 6, Fig. 14, and as the sheets continue to be fed into the lay-boy 4, and become stacked or piled on the main support 11, the main support 11 becomes automatically lowered, by degrees, Figs. 15 and 16, in order to maintain the level of the stack or pile of sheets 56 approximately uniform. This may be effected in any desired manner, as under the control of oscillatory hooked members 12, as described, for example, in Letters Patent 1,545,912, issued July 14, 1925, to Charles B. Maxson. In time, the support will become lowered to the floor, as shown in Figs. 1 and 16. An auxiliary support for temporarily receiving the sheets 56 during the removal of the completed stack and the replacement of a new main support 11 then is rendered effective on which the sheets 56 may continue to be stacked or piled temporarily, for subsequent transfer to a substituted empty main support 11 made ready in the lay-boy, as shown in Figs. 17 and 18. The auxiliary support is preferably constituted of a plurality of horizontally disposed supporting fingers 28 arranged in the form of a grid disposed normally just below the tapes 2 and 6 from side to side of the machine. Where light stock is used, the distance between the tapes and the fingers 28 may be considerably smaller than when heavier stock is used, say of the order of four or five inches, more or less, in order to reduce the tendency for the light stock to double over on being released by the tapes. The fingers 28 are of relatively small cross-dimension vertically. A very satisfactory form that the fingers may assume is ¾ inch square tubing. A space of ¾ inch is available above the top of the completed stack and below the level of the path of feed of the sheets 56 at the time that the sheets 56 are delivered by the tapes 2 and 6 thereabove into the lay-boy 4. The fingers may be about 2½ inches apart. The forward free ends of the tubing fingers 28 are plugged, as shown at 30. The rear ends of the tubing fingers 28 are secured to the transversely disposed bar of a carriage 3, Figs. 1A to 4 and 8 to 12, and they receive flexible hosing connections 104 that may communicate air pressure to the fingers 28. The connections 104 are fed from a rotatable-joint coupling bar 102 which is supplied with air from a common delivery connection 100. Within the tubular fingers 28 may be disposed air hoses 110, Figs. 5, 8 and 10 apertured at spaced intervals to communicate with apertures 108 in the upper surfaces of the fingers 28.

The transversely disposed bar of this carriage 3 is provided at its ends with guide plates 34 each having a pair of upper and a pair of lower guide rollers 36. The guide plates 34 are mounted to slide along longitudinally disposed tracks 38, one at each side of the machine, the upper and lower pairs of rollers 36 respectively engaging the upper and lower surfaces of the tracks 38 for antifriction purposes. The carriage 3 is thus slidable back and forth longitudinally of the machine.

Figure 11:
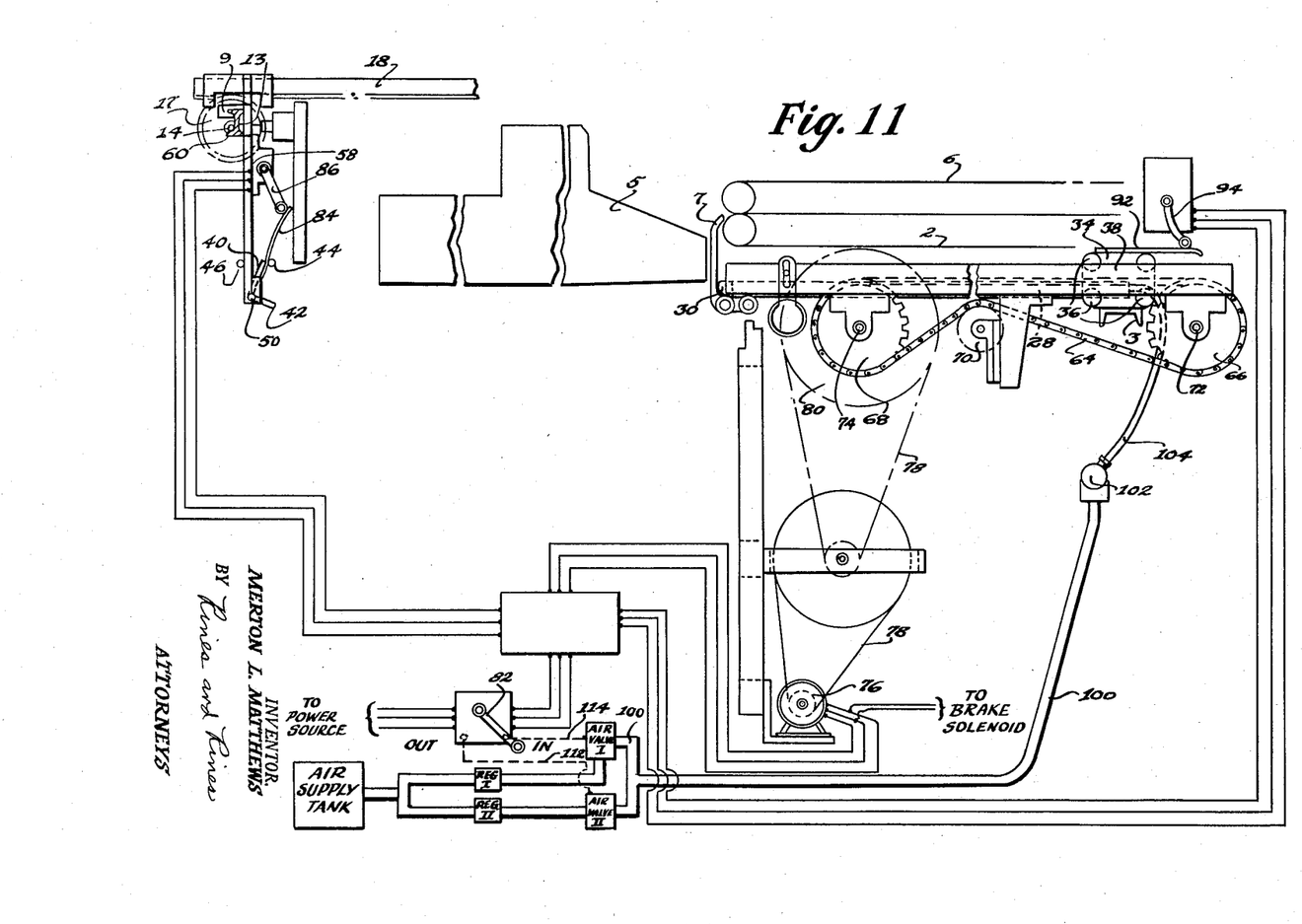
Fig. 11 is a fragmentary side elevation of a portion of the machine in a diagrammatic view of circuits for controlling the operation of extending and retracting the auxiliary supporting fingers and the air pressure operation, the supporting fingers being shown retracted.

The fingers 28 are normally retracted toward the frame 26 along the slide 38 so as to be disposed in back of the rear joggers 7, as shown in Figs. 1, 1A and 11. At the completion of a stack, however, the carriage 3 to which these rear ends are secured is actuated horizontally forward along the tracks 38 toward the lay-boy 4, in order to carry the fingers 28 beyond the stationary fingers 8 and the rear joggers 7, into the lay-boy 4, so as to dispose them just above the top sheet of the completed stack, and below the tapes 2 and 6, as illustrated in Figs. 2, 3, 12 and 16.

Figure 2:
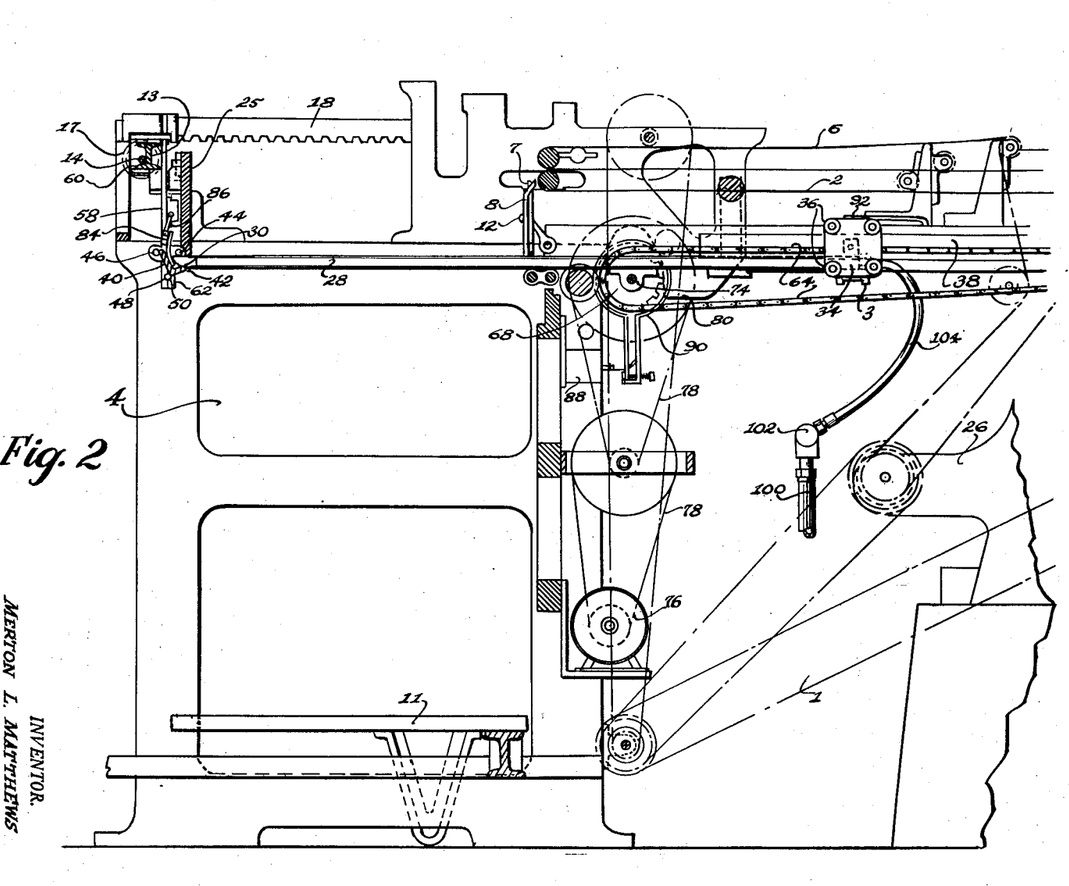
Fig. 2 is a section taken upon the line 2—2 of Fig. 3, looking in the direction of the arrows.
Figure 3:
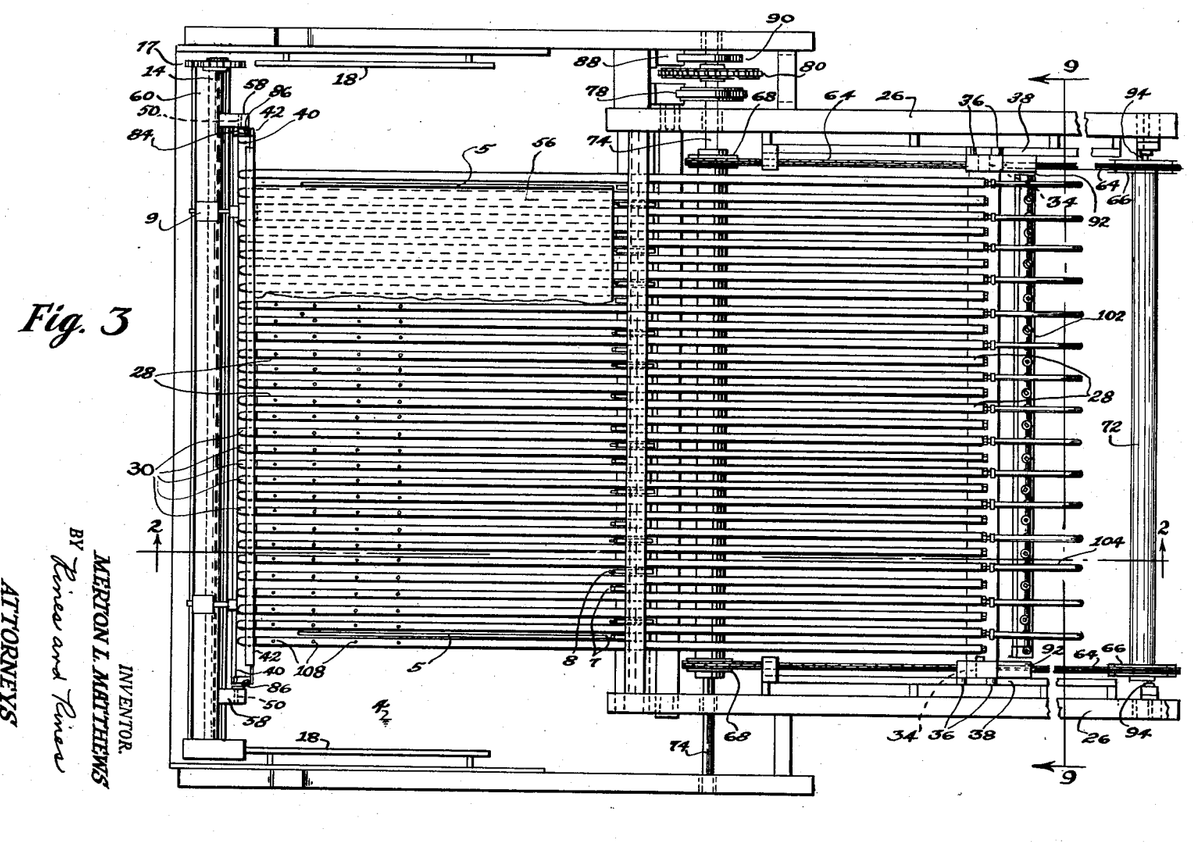
Fig. 3 is a plan of the left-hand portion of the machine shown in Figs. 1 and 1A, the auxiliary supporting fingers being shown extended, with a portion of a sheet resting thereon.
Figure 4:
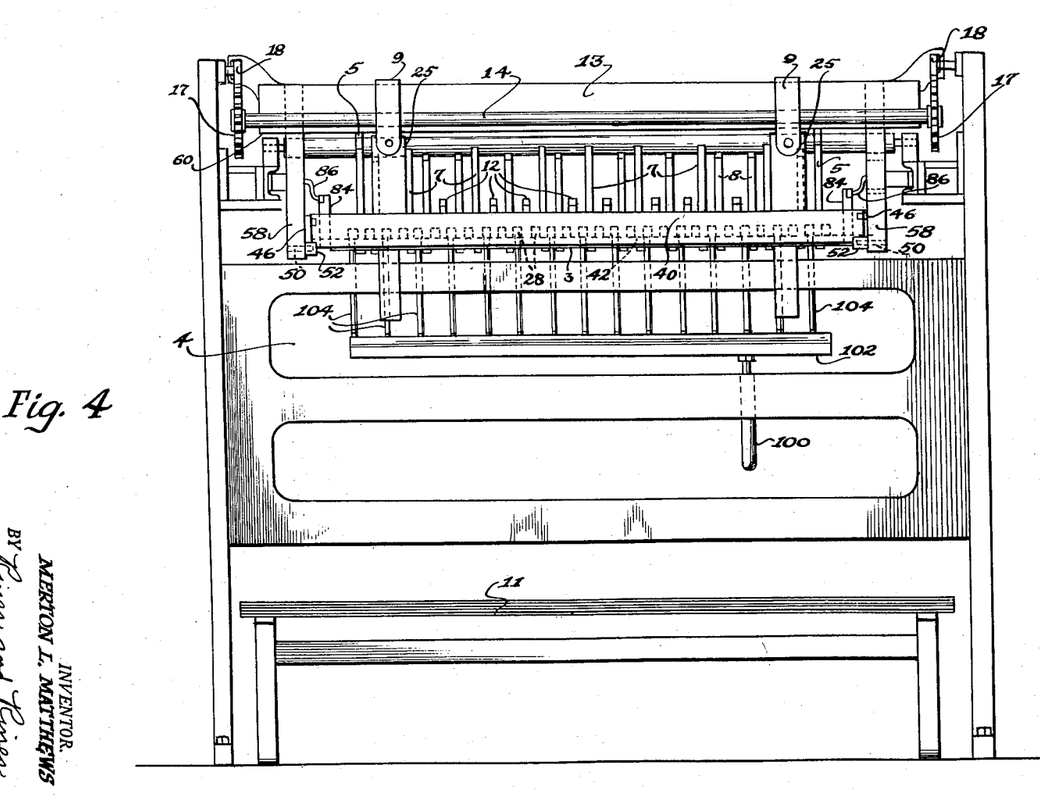
Fig. 4 is an end elevation, looking from the left of Figs. 1, 1A, 2 and 3.

Upon the completion of the stack and just prior to the main support or platform 11 reaching the floor, the supporting fingers 28 are extended forward into the lay-boy 4 to the position of Figs. 2, 3, and 16. The support 11 is lowered the remaining short distance to the floor later, electrically or manually. The fingers 28 are extended forward rapidly, so that the next following sheets 56 fed from between the tapes 2 and 6 will be received temporarily upon the upper substantially co-planar surfaces of the extending fingers 28, instead of on the stack below, and without shutting down the equipment. In order to provide the air cushion, before mentioned, for floating the initial sheet or sheets received upon the auxiliary support, thereby to prevent slippage and to overcome any tendency for the on-coming stream of sheets to double down under and "ball up" the stacking, air pressure is supplied in the connections 104 at the time of extension of the auxiliary support fingers 28. A lifting force is thus exerted upward against the initial sheets as the air is released above the upper surface of the auxiliary support through the apertures 108. The stabilizing effect of the resulting air cushion is illustrated in somewhat exaggerated form at 109 in Fig. 16. It is, of course, to be understood that the lifting force may also be exerted in other ways than by air pressure, such as with the aid of compressed gases and the like, though air pressure is preferred for reasons of economics and control facility. All of the fingers 28 need not be air-fed since satisfactory air blast coverage over the auxiliary support surface may be obtained with, for example, every other finger equipped as above described.

The tapes 2 and 6 continue to feed the sheets 56 on to the extending fingers 28, during the removal of the main support 11, with the stack thereon, and the substitution therefor of a new main skid support 11, Fig. 17. The new main skid support 11 is thereupon raised, by means of a well-known lay-boy elevating table, not shown, to its uppermost position, just below and in contact with the extending fingers 28, Fig. 18. The extending fingers 28 are thereupon retracted to their original position, shown in Fig. 1. The sheets thus temporarily stacked on the extended fingers 28 become thereupon automatically lowered on to the new main support 11, through the small vertical space corresponding to the thickness of the fingers 28.

In order, as previously stated, to overcome frictional forces tending to cause the bottom sheet to adhere to the upper surface of the fingers 28 of the auxiliary support when the fingers are withdrawn, air pressure is again supplied to the fingers, as shown in exaggerated fashion in Fig. 18. Since a greater force may, in some cases, be required to overcome these frictional forces than to stabilize the initial sheets deposited upon the auxiliary support, increased air pressure may be employed when the fingers 28 are withdrawn, though the same pressure has been successfully employed for both functions with particular types of relatively light weight paper. Satisfactory operation has been obtained, for example, with pressures of approximately 40 pounds per square inch, more or less.

Figure 12:
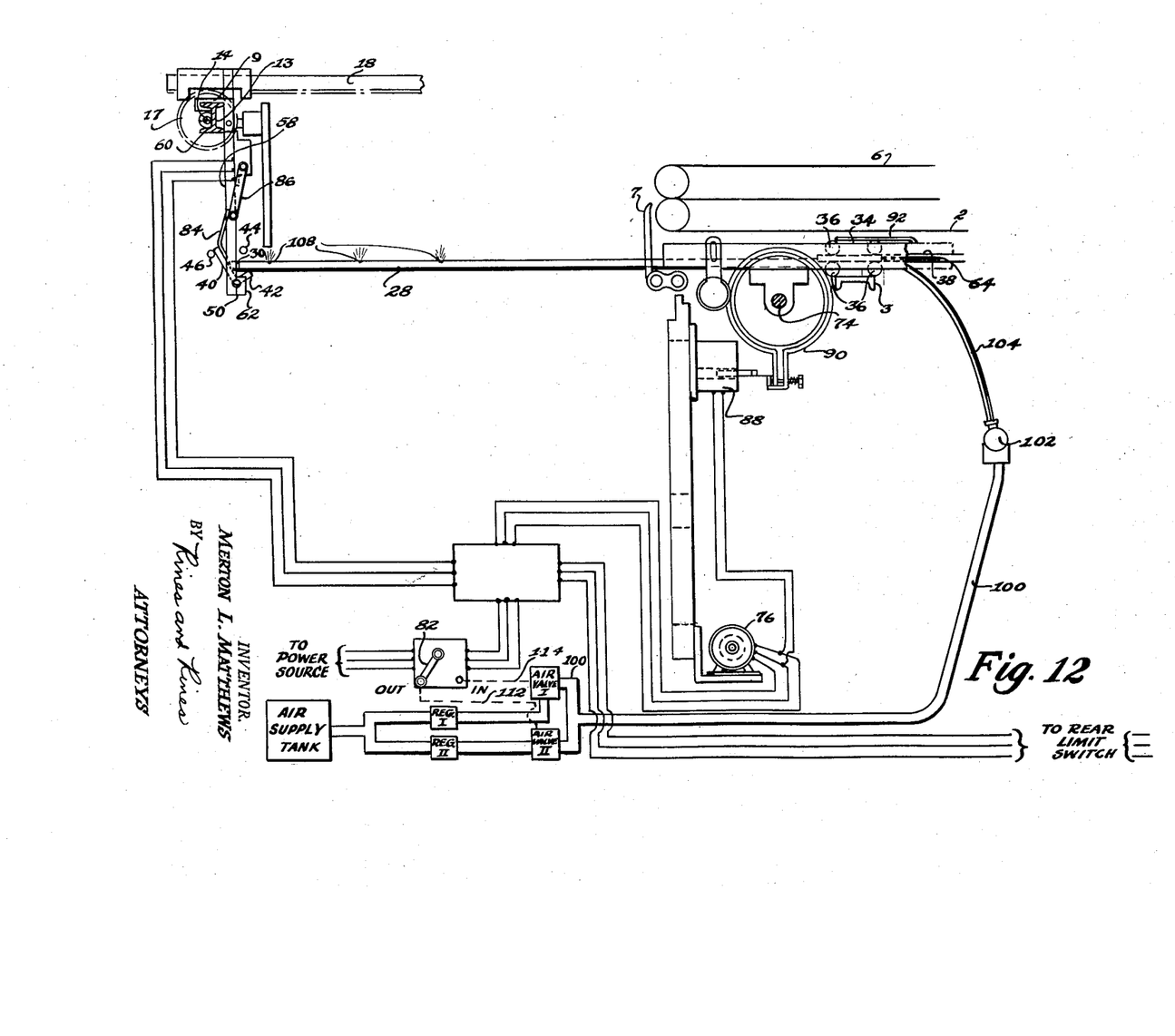
Fig. 12 is a view similar to Fig. 11, showing the supporting fingers extended.

Fingers 28 of so small-diameter tubing, being naturally very flexible, would be unable, however, to carry the load of the sheets 56 temporarily stacked thereon, were it not for the following supporting features. As illustrated in Figs. 1, 3, 4, 7 and 12, a two-armed pivoted member, of right-angular cross-section, extending from side to side of the machine, is normally so disposed that its angle is normally oriented toward on-coming fingers 28, with its upper or more or less upright arm 40 at the level of the horizontally disposed fingers 28, and tilting toward the right, as viewed in Fig. 1, toward the fingers 28. As the free plugged ends 30 of the fingers enter this angle, therefore, toward the limit of their forward movement into the lay-boy 4, they engage this upper arm 40 in order to effect pivotal movement of the angle member, tilting it backward, from the position of Fig. 11 into the position of Figs. 2 and 12. The other or more or less horizontally disposed arm 42, which normally inclines somewhat downward, is thus caused to pivot upward, thus to effect engagement of the undersides of the forward free ends 30 of the fingers 28, as shown in Figs. 2 and 12, thus turning them up and providing a support for the forward ends of the fingers. The pivotal movement of the angle-irons 40, 42 is limited by forward and rear stops 44 and 46.

Figures 7, 8, 9, 10:
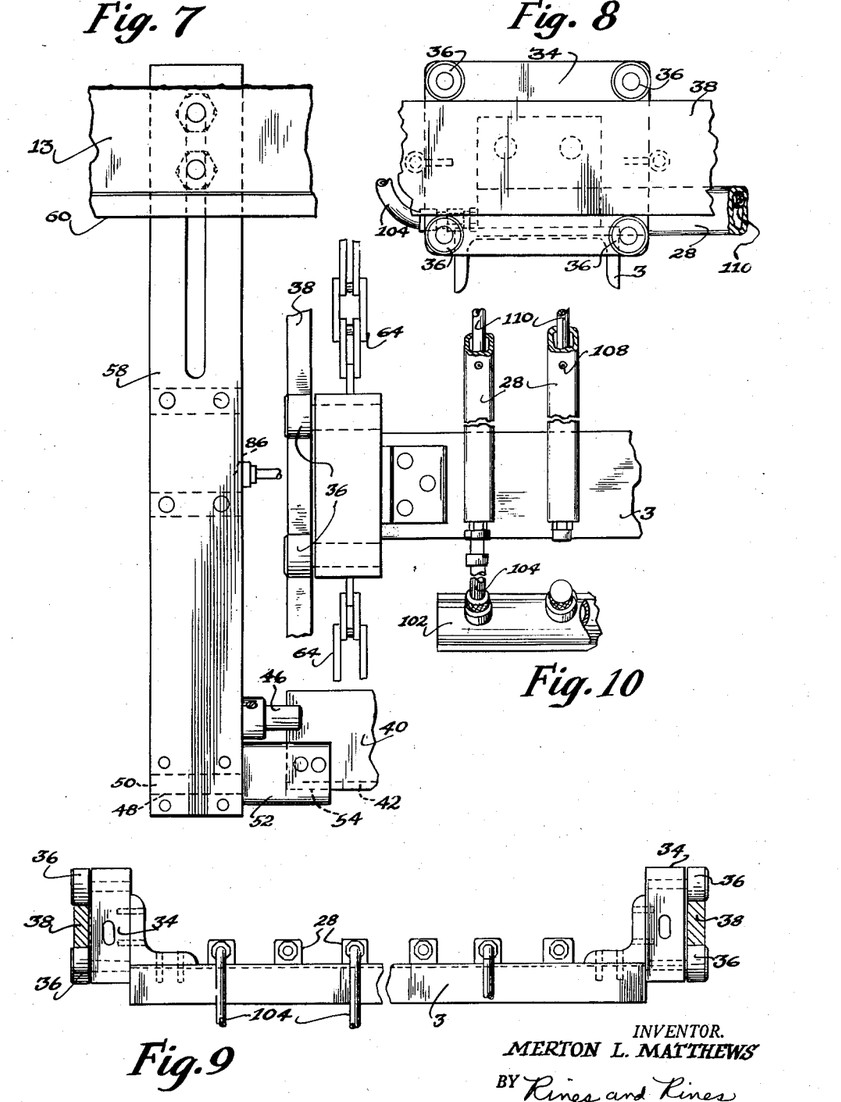
Fig. 7 is a fragmentary front elevation, upon a larger scale, of the I-beam and angle construction shown in side elevation at the upper left of Fig. 1.
Fig. 8 is an elevation of a detail showing the rear support for the supporting fingers, looking from the left, as viewed in Fig. 4, but upon a larger scale.
Fig. 9 is a section taken upon the line 9—9 of Fig. 3, looking in the direction of the arrows, upon a larger scale.
Fig. 10 is a view looking from above, in Fig. 8.

The pivoting of the angle member 40, 42, may be effected in any desired way, as by means of pivot pins 50 projecting from plates 52 provided with angular grooves 54 in which the ends of the angle iron are fitted as will be understood more particularly from Figs. 3, 7 and 13.

The pivot pins 50 extend into pivot openings 48, Figs. 2, 7 and 13, disposed at the lower ends of the supporting arms 58. For purposes of assembly, each pivot opening is provided half in the arm 58 and the mating half in a block 62 bolted to the supporting arm 58, Fig. 2.

As the auxiliary support constituted of the supporting fingers 28 is thus supported at two points, spaced a considerable distance apart, by the carriage 3 and the angle iron 40, 42, there is no possibility for any sagging or flexing of the fingers 28, and they may therefore carry a considerable load. Though the angle iron 40, 42, moreover, normally occupies the position illustrated in Fig. 1, in which it is ineffective to support the front free ends 30 of the supporting fingers 28, it is the fingers 28 themselves, when they reach their forward limit of movement, that render the angle iron effective, by tilting its automatically into the position shown in Fig. 2.

It has been stated above that the machine may be adjusted to the handling of different-length sheets by adjusting the position of the stops 25. It is necessary, of course, to adjust the position of the angle iron 40, 42 to correspond. All that is necessary, to this end, is to mount the angle iron 40, 42 upon the same carriage upon which is mounted the transversely disposed I-shaped arm 13, 60 that carries the front stops 25. The plates 52 for supporting the ends of the angle iron 40, 42 are therefore disposed at the lower ends of the arms 58, shown adjustably bolted to the ends of the supporting arm 13 in Fig. 13. When the operator adjusts the machine so as to set the front stops 25 for the particular-size sheets 56 fed and stacked in the machine, therefore, he at the same time automatically adjusts properly the position of the angle iron 40, 42 also. The vertical position of the angle iron 40, 42 may also be adjusted by bolting the supporting arm 58 at different vertical positions to the transversely disposed supporting arm 13, 60, as by means of the bolt-and-slot connections shown in Figs. 7 and 13.

The same front stops 25 and the same side joggers 5 and rear joggers 7 that operate normally to even up the stack as the sheets 56 are fed on to the main skid support 11, therefore, operate also to even up the sheets 56 while they are being temporarily stacked in the auxiliary support constituted of the extending fingers 28. When the supporting fingers 28 are retracted, therefore, they will comb out from under the sheets 56 temporarily stacked thereon, and will travel back through the stationary fingers 8 and the rear joggers 7. The temporarily stacked sheets 56 will therefore become deposited on the substituted skid support 11 in an even uniform pile.

The rear joggers 7, the stationary fingers 8 and the hooked members 12 are disposed in the spaces between adjacently disposed fingers 28. The level of the fingers 28 is just above the bottoms of the stops 25, in order that the same stops 25 may serve during the stacking of both the main and the temporary stacks or piles of sheets 56. The main support 11, when first introduced into the lay-boy, is raised into contact with the bottoms of the stops 25. The retracted temporary pile, therefore, drops only a very small distance on to the new main support 11 when the fingers 28 are retracted.

The carriage 3 to which the rear ends of the extending supporting fingers 28 are secured is actuated back and forth, to move the extending fingers 28 into and out of the lay-boy 4, by means of two sprocket chains 64 the ends of which are secured to the opposite ends of the respective guide plates 34. The sprocket chains 64 each passes over sprocket wheels 66 and 68 and a sprocket-chain tightener 70. The sprocket wheels 66 are mounted at the opposite ends of a transversely disposed shaft 72 and the sprocket wheels 68 at the opposite ends of a similarly disposed shaft 74. The shaft 74 is driven from a motor 76 through connections 78 and a sprocket wheel 80 mounted upon the shaft 74. The supporting fingers 28 may therefore be actuated into and out of the lay-boy 4 merely by reversing the operation of the motor 76.

Assuming that the fingers 28 occupy the retracted position diagrammatically shown in Fig. 11, and that a stack has been completed on the main skid support 11, a switch 82 may be manipulated from the "in" position of Fig. 11 to the "out" position, as shown in Fig. 12. This sets the motor 76 into operation in one direction, in order to actuate the fingers 28 into the lay-boy 4, as diagrammatically shown in Fig. 12, to a position just above the top of the stack supported by the main support 11. The fingers 28 become thus positioned in the path of the feed of the sheets 56, in replacement for the top of the just-completed stack. The feeding of the sheets 56 may therefore continue, without interruption, the fingers 28, as before explained, constituting an auxiliary support for the sheets 56. A new stack of sheets, but much smaller than the regular stack before described, becomes thus temporarily deposited on this auxiliary support.

By causing the switch 82, when adjusted to the "out" position, to act through the dotted ganged connection 112 to open an air valve, labelled "Air Valve II," Fig. 12, air pressure may be supplied from the "Air Supply Tank" through a pressure regulator, labelled "Reg. II," to the common supply line 100. The air is communicated through the before-mentioned coupling bar 102, which has become rotated counterclockwise, to the flexible couplings 104, and hence to the fingers 28. At the time the fingers 28 are extended, therefore, an air cushion is provided thereabove as illustrated in Fig. 16 to act upon the initial sheet or sheets directed upon the auxiliary support.

Upon the forward ends 30 of the fingers 28 tilting the angle iron 40, 42, from the position of Fig. 11 into the position of Fig. 12, a lever 84 will be actuated, in response to this tilting movement of the angle iron 40, 42, from the position of Fig. 11 into that of Fig. 12, thus causing the position of a front limit switch 86 to open the circuit for the motor 76 and deenergize a solenoid 88, Fig. 12, for actuating a brake 90 that is normally released when the motor 76 is in operation, thus to stop the motor 76 short and, also, to close the air valve "Air Valve II," thus shutting off the air pressure directed above the fingers 28. The front limit switch 86 and the lever 84, of course, are adjustable as a unit with the angle iron 40, 42, and the front stops 25, being mounted on the arm 58.

When, after a new skid support 11 has been placed in position, it is desired to retract the fingers 28, so as to deposit the sheets 56 temporarily stacked thereon on to the new skid support 11, the switch 82 will be actuated from the "out" position, as shown in Fig. 12, to the "in" position, illustrated in Fig. 11. The motor 76 is thereupon actuated in the reverse direction. At the same time, through the dotted ganged connection 114, the switch 82 effects the opening of a further air valve, labelled "Air Valve I." Air pressure is thus supplied from the tank through a further pressure regulator "Reg. I" to the common line 100 and hence to the fingers 28 for the anti-friction or anti-adhesion function previously described in connection with Fig. 18.

As the free ends 30 of the fingers 28 become thus withdrawn from the angle iron 40, 42, they cannot help but re-tip the angle iron 40, 42, into the normal position, illustrated in Fig. 11. This is because of the weight that the free ends 30 of the fingers 28 impose on the arms 42 of the angle iron. This return tilting movement of the angle iron causes the lever 84 to return to the limit switch 86, from the position illustrated in Fig. 12, to the original position illustrated in Fig. 11.

When the carriage 3 supporting the rear ends of the fingers 28 reaches its original position, an arm 92 projecting rearwardly thereof engages a rear limit switch 94, Fig. 11, to open the circuit of the motor 76 and to close the "Air Valve I."

The angle iron 40, 42, serves a further function as a safety device to prevent injury to the operator or other person who may happen to be in the vicinity of the machine during the forward movement of the supporting fingers 28 into the lay-boy 4. These fingers 28 enter the lay-boy 4 at considerable speed. In the absence of the angle iron 40, 42, therefore, and if the brake 90 should happen not to operate perfectly, they may travel out forward beyond the front stops 25, to strike a person who may happen to be standing in front of the lay-boy 4. The angle-iron 40, 42, insures that no such injury shall take place.

While the operation of the air pressure in Figs. 11 and 12 is substantially synchronous with or simultaneous with the extension and retraction of the fingers 28 and for the brief intervals of extension and retraction only, the air pressure could, if desired, be applied continuously from the time of extension to the time of retraction; though such operation would not be so economical. Under such conditions, however, it would be unnecessary to provide connections between the air controls and the finger extend and retract controls. The operator would merely hold down the air control valve II at the same time he operates the switch 82 to the "out" position. He would then release the air control valve II, and, before operating the switch 82 to the "in" position, the operator would hold down the air control valve I. It is also to be understood that air pressure could be applied only at the time of extension, or only at the time of retraction, and not at both times, if the anti-adhesion or air cushion functions are not both necessary in a particular equipment.

Figures 5, 6:
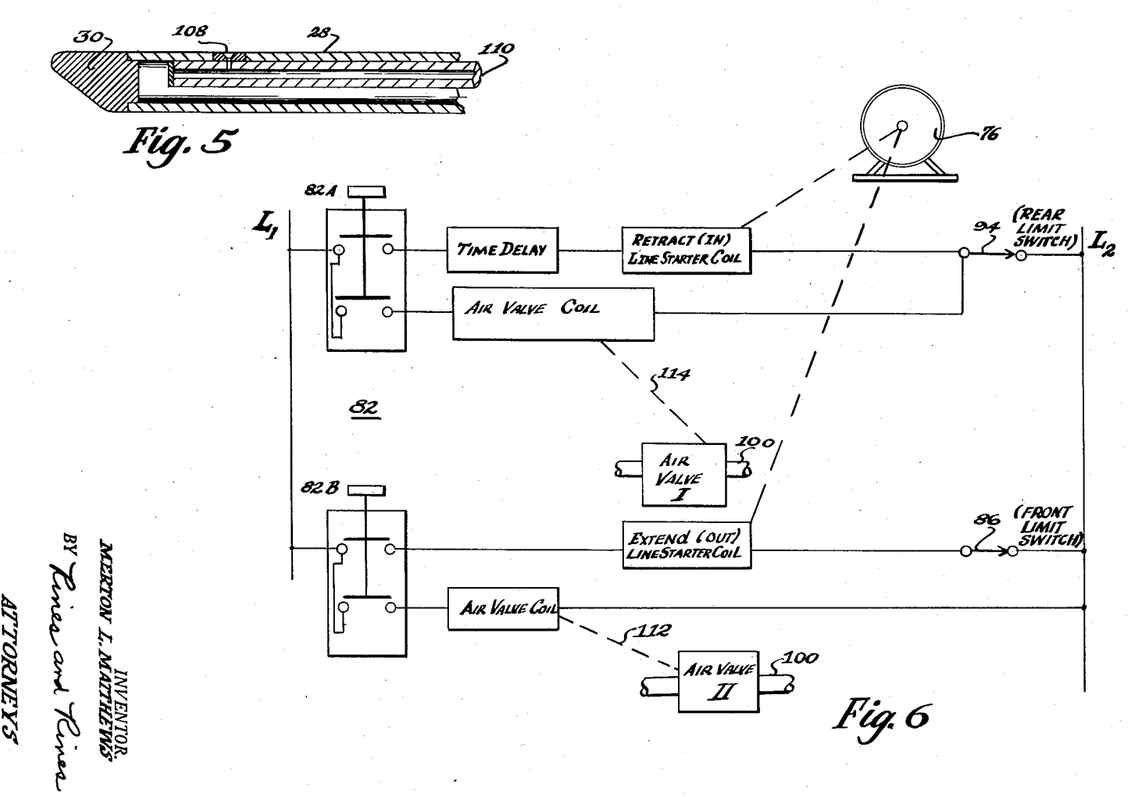
Fig. 5 is an elevation, upon an enlarged scale and partly in longitudinal section, of one of the auxiliary supporting fingers.
Fig. 6 is a block diagram of a modified finger-retracting and air pressure control system, for use in the system of Figs. 11 and 12.

A somewhat more elaborate system is illustrated in Fig. 6. The switch 82 is there shown provided with a pair of push-button contacts 82A and 82B. When button 82B is depressed, the "Extend Line Starter Coil" becomes connected between the sides $L_1$ and $L_2$ of the mains, energizing the motor 76. A coil for operating the "Air Valve II," labelled "Air Valve Coil" also is energized. While the front limit switch 86 will, as before described, stop the motor 76 by opening the circuit when the fingers are fully extended, the operator can introduce a time delay into the release of the air valve II merely by keeping the button 82B depressed, as desired.

When the fingers are to be retracted, the push-button 82A may be depressed energizing the "air valve coil" that controls the "Air Valve I." Air pressure will thus be applied to the bottom sheet of the stack upon the auxiliary support. This will be in advance of the actual retraction of the fingers. After a predetermined period of time thereafter, determined by a time delay device, such as a time-constant electric network, of, for example, fifteen seconds delay, more or less, the retract line starter coil will become energized and the motor 76 will retract the fingers 28. The previously described rear limit switch 94 will thereupon open the air valve coil and retract line-starter-coil circuits.

The present invention is adapted for the feeding and stacking of sheets of any practical length, of any weight stock. It may be employed, for example, to feed and stack sheets 80 inches long and 3/32 of an inch thick. It is particularly adapted, however, as before explained, to stack sheets of comparatively light weight.

A description of many portions of the machine an understanding of which is not essential to an understanding of the present invention has purposely been omitted and many parts of the machine have purposely not been illustrated in order not to detract attention from the features of essential novelty. Fuller explanations of such portions of the machine will be found in the Letters Patent above referred to.

It will be understood that the features of novelty may be embodied in other machines and in machines of other types and that further modifications may be made by persons skilled in the art without departing from the spirit and scope of the invention as defined in the appended claims.

What is claimed is:

1. A method of the character described that comprises feeding sheets along a predetermined direction, receiving and stacking the fed sheets upon a surface, exerting a force above the said surface first against the initial sheets received thereupon, in order to float the same above the surface, and then against the bottom sheet of a stack of sheets received thereupon in order to prevent adhesion of the said bottom sheet to the said surface.

2. A method of the character described that comprises feeding sheets along a predetermined direction, receiving and stacking the fed sheets upon a surface, and directing air pressure above the said surface first against the initial sheets received thereupon, in order to float the same above the surface, and then against the bottom sheet of a stack of sheets received thereupon in order to prevent adhesion of the said bottom sheet to the said surface.

3. A method of the character described that comprises feeding sheets along a predetermined direction, receiving and stacking the fed sheets upon a surface, and directing air pressure above the said surface first against the initial sheets received thereupon, in order to float the same above the surface, and then, with increased pressure, against the bottom sheet of a stack of sheets received thereupon in order to prevent adhesion of the said bottom sheet to the said surface.

4. A method of the character described that comprises feeding sheets along a predetermined direction, receiving and stacking the fed sheets upon a main surface, substituting an auxiliary surface for the main surface when the latter has received a predetermined stack of sheets in order to permit the continued feeding and stacking of sheets while an empty main surface is made ready, exerting a force above the auxiliary surface first against the initial sheets received thereupon, in order to float the same above the auxiliary surface, and then against the bottom sheet of the stack received upon the auxiliary surface to prevent adhesion to the auxiliary surface, and removing the auxiliary surface to deposit the sheets stacked thereupon upon the empty main surface.

5. A method of the character described that comprises feeding sheets along a predetermined direction, receiving and stacking the fed sheets upon a main surface, substituting an auxiliary surface for the main surface when the latter has received a predetermined stack of sheets in order to permit the continued feeding and stacking of sheets while an empty main surface is made ready, directing air pressure above the auxiliary surface against the initial sheets received thereupon, in order to float the same above the auxiliary surface, and then against the bottom sheet of the stack received upon the auxiliary surface to prevent adhesion to the auxiliary surface, and removing the auxiliary surface to deposit the sheets stacked thereupon upon the empty main surface.

6. A method of the character described that comprises feeding sheets along a predetermined direction, receiving and stacking the fed sheets upon a main surface, substituting an auxiliary surface for the main surface when the latter has received a predetermined stack of sheets in order to permit the continued feeding and stacking of sheets while an empty main surface is made ready, directing air pressure above the auxiliary surface against the initial sheets received thereupon, in order to float the same above the auxiliary surface, and then, with increased pressure, against the bottom sheet of the stack received upon the auxiliary surface to prevent adhesion to the auxiliary surface, and removing the auxiliary surface to deposit the sheets stacked thereupon upon the empty main surface.

7. In a sheet-feeding-and-stacking machine having a main support disposed in the path of feed of the sheets in order to receive the sheets and stack the same, an auxiliary support, means operable when the main support has received a predetermined stack of sheets for disposing the auxiliary support in the said path to receive and stack sheets while an empty main support is made ready, means for providing air pressure, means for communicating the providing means with the auxiliary support in order first to produce an air cushion thereabove for floating the initial sheets received upon the auxiliary support and then to prevent adhesion to the auxiliary support of the bottom sheet of a stack of sheets received upon the auxiliary support, and means for removing the auxiliary support to deposit the sheets stacked thereupon upon the empty main support.

8. In a sheet-feeding-and-stacking machine having a main support disposed in the path of feed of the sheets in order to receive the sheets and stack the same, an auxiliary support, means operable when the main support has received a predetermined stack of sheets for disposing the auxiliary support in the said path to receive and stack sheets while an empty main support is made ready, means for providing air pressure, means for communicating the providing means with the auxiliary support in order first to produce an air cushion thereabove for floating the initial sheets received upon the auxiliary support and then, with increased air pressure, to prevent adhesion to the auxiliary support of the bottom sheet of a stack of sheets received upon the auxiliary support, and means for removing the auxiliary support to deposit the sheets stacked thereupon upon the empty main support.

9. In a sheet-feeding-and-stacking machine having a support comprising a plurality of fingers disposed in the path of feed of the sheets in order to receive the sheets and stack the same, means for providing air pressure, and means for communicating the providing means with the fingers to prevent adhesion to the fingers of the bottom sheet of a stack of sheets received upon the support.

10. In a sheet-feeding-and-stacking machine having a main support disposed in the path of feed of the sheets in order to receive the sheets and stack the same, an auxiliary support comprising a plurality of fingers, means operable when the main support has received a predetermined stack of sheets for disposing the auxiliary support in the said path to receive and stack sheets while an empty main support is made ready, means for providing air pressure, means for communicating the providing means with the auxiliary support fingers to prevent adhesion thereto of the bottom sheet of a stack of sheets received upon the auxiliary support, and means for removing the auxiliary support to deposit the sheets stacked thereupon upon the empty main support.

11. In a sheet-feeding-and-stacking machine having a main support disposed in the path of feed of the sheets in order to receive the sheets and stack the same, an auxiliary support comprising a plurality of fingers, means operable when the main support has received a predetermined stack of sheets for disposing the auxiliary support in the said path to receive and stack sheets while an empty main support is made ready, means for providing air pressure, means for communicating the providing means with the auxiliary support in order first to produce an air cushion thereabove for floating the initial sheets received upon the auxiliary support and then to prevent adhesion to the fingers of the bottom sheet of a stack of sheets received upon the auxiliary support, and means for removing the auxiliary support to deposit the sheets stacked thereupon upon the empty main support.

12. In a sheet-feeding-and-stacking machine having a main support disposed in the path of feed of the sheets in order to receive the sheets and stack the same, an auxiliary support comprising a plurality of apertured tubular fingers, means operable when the main support has received a predetermined stack of sheets for disposing the auxiliary support in the said path to receive and stack sheets while an empty main support is made ready, means for providing air pressure, and means for communicating the providing means with the auxiliary support in order to direct air pressure through the tubular fingers and out the apertures thereof to produce an air cushion thereabove for floating the initial sheets received upon the auxiliary support.

13. In a sheet-feeding-and-stacking machine having a main support disposed in the path of feed of the sheets in order to receive the sheets and stack the same, an auxiliary support comprising a plurality of apertured tubular fingers, means operable when the main support has received a predetermined stack of sheets for disposing the auxiliary support in the said path to receive and stack sheets while an empty main support is made ready, means for providing air pressure, means for communicating the providing means with the auxiliary support to direct air pressure through the tubular fingers and out the apertures thereof to prevent adhesion thereto of the bottom sheet of a stack of sheets received upon the auxiliary support, and means for removing the auxiliary support to deposit the sheets stacked thereupon upon the empty main support.

14. In a sheet-feeding-and-stacking machine, a support comprising a plurality of tubular fingers defining a surface for receiving and stacking sheets, the fingers being apertured along the said surface, and means for directing air pressure within the fingers and through the apertures thereof.

15. In a sheet-feeding-and-stacking machine having a main support disposed in the path of feed of the sheets in order to receive the sheets and stack the same, an auxiliary support comprising a plurality of apertured tubular fingers, means operable when the main support has received a predetermined stack of sheets for disposing the auxiliary support in the said path to receive and stack sheets while an empty main support is made ready, means for providing air pressure, means for communicating the providing means with the auxiliary support in order to direct air pressure through the tubular fingers and out the apertures thereof first to produce an air cushion thereabove for floating the initial sheets received upon the auxiliary support and then to prevent adhesion to the auxiliary support fingers of the bottom sheet of a stack of sheets received upon the auxiliary support, and means for removing the auxiliary support to deposit the sheets stacked thereupon upon the empty main support.

16. A sheet-feeding-and-stacking machine having, in combination, a main support for a stack of sheets, means for feeding sheets forward to the main support for stacking thereon, a carriage, an auxiliary support the rear end of which is mounted on the carriage, means for actuating the carriage to dispose the auxiliary support above the main support in the path of feed of the sheets in order that the feeding means may feed the sheets to the auxiliary support for stacking on the auxiliary support, and means operated synchronously with the actuating means for communicating air pressure to the surface of the auxiliary support upon which the sheets are stacked.

17. A sheet-feeding-and-stacking machine having, in combination, a main support for a stack of sheets, means for feeding sheets forward to the main support for stacking thereon, a carriage, an auxiliary support the rear end of which is mounted on the carriage, means for actuating the carriage to dispose the auxiliary support above the main support in the path of feed of the sheets in order that the feeding means may feed the sheets to the auxiliary support for stacking on the auxiliary support, means operated synchronously with the actuating means for communicating air pressure to the surface of the auxiliary support upon which the sheets are stacked, normally ineffective means for supporting the forward end of the auxiliary support when the auxiliary support is disposed above the main support, means controlled by the auxiliary support when disposed above the main support for rendering the supporting means effective, and means controlled by the rendering effective of the supporting means for terminating the air-pressure communication to the auxiliary support.

18. A sheet-feeding-and-stacking machine as claimed in claim 17 and in which time-delay means is provided for permitting the said air-pressure communication to the auxiliary support to continue for a predetermined time after the rendering effective of the supporting means.

19. A sheet-feeding-and-stacking machine having, in combination, a main support for a stack of sheets, means for feeding sheets forward to the main support for stacking thereon, a carriage, an auxiliary support the rear end of which is mounted on the carriage, means for actuating the carriage to dispose the auxiliary support above the main support in the path of feed of the sheets in order that the feeding means may feed the sheets to the auxiliary support for stacking on the auxiliary support, means for thereafter actuating the carriage to withdraw the auxiliary support, and means for directing air pressure between the auxiliary support and the bottom sheet of the stack of sheets upon the auxiliay support to prevent adhesion to the auxiliary support at the time of its withdrawal.

20. A sheet-feeding-and-stacking machine as claimed in claim 17 and in which time-delay means is provided for directing the said air pressure a predetermined time in advance of the withdrawal of the auxiliary support.

21. A sheet-feeding-and-stacking machine having, in combination, a frame, a lay-boy in which a main support may be disposed, a plurality of tapes mounted on the frame above and to the rear of the lay-boy for feeding sheets forward into the lay-boy for stacking therein on the main support, a carriage, a plurality of tubular apertured fingers constituting an auxiliary support and the rear ends of which are mounted on the carriage so that the fingers are normally disposed under the tapes, means for actuating the carriage forward into the lay-boy to dispose the fingers above the main support below the tapes in order that the tapes may feed the sheets to the fingers for stacking on the fingers, air-pressure connections to the rear ends of the fingers for communicating air through the fingers and out the apertures thereof above the auxiliary support, normally ineffective means for supporting the forward ends of the fingers when the fingers are disposed above the main support, and means controlled by the fingers when disposed above the main support for rendering the supporting means effective.

22. A method of the character described that comprises feeding sheets along a predetermined direction toward a surface, receiving and stacking the fed sheets upon the surface and thereafter removing the stack of fed sheets from the surface, and exerting a force above the surface first against the initial sheets received thereupon, in order to float the same above the surface during the receipt and stacking of the sheets thereupon, and then against the bottom sheet of the stack of sheets received and stacked thereupon in order to prevent adhesion of the said bottom sheet to the surface during the removal of the stack of fed sheets from the surface.

23. A method of the character described that comprises feeding sheets along a predetermined direction toward a surface, receiving and stacking the fed sheets upon the surface and thereafter removing the stack of fed sheets from the surface, and directing air pressure above the surface first against the initial sheets received thereupon, in order to float the same above the surface during the receipt and stacking of the sheets thereupon, and then against the bottom sheet of the stack of sheets received and stacked thereupon in order to prevent adhesion of the said bottom sheet to the surface during the removal of the stack of fed sheets from the surface.

24. A method of the character described that comprises feeding sheets along a predetermined direction toward a surface, receiving and stacking the fed sheets upon the surface and thereafter removing the stack of fed sheets from the surface, and directing air pressure above the surface first against the initial sheets received thereupon, in order to float the same above the surface during the receipt and stacking of the sheets thereupon, and then, with increased pressure, against the bottom sheet of the stack of sheets received and stacked thereupon in order to prevent adhesion of the said bottom sheet to the surface during the removal of the stack of sheets from the surface.

25. A machine of the character described having, in combination, a support, means for feeding successively a plurality of sheets to and upon the support to stack the sheets thereon and, after the sheets have become stacked thereon, for removing the stack of sheets therefrom, and means for directing air under pressure; first, between the support and the sheets initially fed thereon in order to float them during their initial feeding; and later, after the sheets have become stacked, between the support and the bottom sheet of the stack in order to prevent adhesion of the said bottom sheet to the support during the removal of the stack therefrom.

26. A machine of the character described having, in combination, a discontinuous support having supporting portions separated by open spaces at the discontinuities, means for feeding successively a plurality of sheets upon the support to stack the sheets thereon and, after the sheets have become stacked thereon, for removing the stack of sheets therefrom, and means for directing air under pressure; first, between the said supporting portions of the discontinuous support and the sheets initially fed thereon in order to float them during their initial feeding; and later, after the sheets have become stacked, between the said supporting portions of the support and the bottom sheet of the stack in order to prevent adhesion of the said bottom sheet to the said supporting portions of the support during the removal of the stack therefrom.

27. A machine of the character described having, in combination, a discontinuous support having a plurality of upwardly apertured substantially horizontally disposed fingers separated by open space between the fingers, means for feeding successively a plurality of sheets upon the support to stack the sheets thereon, and, after the sheets have become stacked thereon, for removing the stack of sheets therefrom; and means for directing air under pressure through the apertures in the fingers: first, between the fingers and the sheets initially fed thereon in order to float them during their initial feeding; and later, after the sheets have become stacked, between the fingers and the bottom sheet of the stack in order to prevent adhesion of the said bottom sheet to the fingers during the removal of the stack therefrom.

28. A machine of the character described having, in combination, a discontinuous support having a plurality of upwardly apertured substantially horizontally disposed fingers separated by open spaces between the fingers, means for feeding successively a plurality of sheets upon the support to stack the sheets thereon, and means for directing air under pressure through the apertures in the fingers between the fingers and the sheets initially fed thereon in order to float them during their initial feeding.

29. A machine of the character described having, in combination, a support, means for feeding successively a plurality of sheets to and upon the support to stack the sheets thereon and, after the sheets have become stacked thereon, for removing the stack of sheets therefrom, means for directing air under pressure between the support and the bottom sheet of the stack in order to prevent adhesion of the said bottom sheet to the support during the removal of the stack therefrom.

30. A machine of the character described having, in combination, a discontinuous support having supporting portions separated by open spaces at the discontinuities, means for depositing a stack of sheets upon the discontinuous support, means for removing the stack of sheets from the discontinuous support, and means for directing air under pressure between the said supporting portions of the support and the bottom sheet of the stack in order to prevent adhesion of the said bottom sheet to the said supporting portions of the support during the removal of the stack therefrom.

31. A machine of the character described having, in combination, a discontinuous support having a plurality of upwardly apertured substantially horizontally disposed fingers separated by open spaces between the fingers, means for depositing a stack of sheets upon the support, means for removing the stack of sheets from the support, and means for directing air under pressure through the apertures in the fingers between the fingers and bottom sheet of the stack in order to prevent adhesion of the said bottom sheet to the fingers during the removal of the stack therefrom.

32. A machine of the character described having, in combination, a discontinuous support having a plurality of upwardly apertured substantially horizontally disposed fingers separated by open spaces between the fingers, means for feeding successively a plurality of sheets to and upon the support to form a stack of sheets upon the support, means for removing the stack of sheets from the support, and means for directing air under pressure against the sheets initially fed to and upon the support between the initially fed sheets and the portions of the support upon which the initially fed sheets are fed in order to float the initially fed sheets above the support during their feeding to and upon the support, and thereafter directing air under pressure against the bottom sheet of the stack between the said bottom sheet and the said portions of the support in order to prevent adhesion of the said bottom sheet to the said portions of the support during the removal of the stack from the support.

33. A machine of the character described having, in combination, a discontinuous support having a plurality of upwardly apertured substantially horizontally disposed fingers separated by open spaces between the fingers, and means for directing air under pressure through the apertures in the fingers against an object resting on the discontinuous support.

34. A sheet-feeding-and-stacking machine having, in combination, a horizontally disposed main support for a stack of sheets, means for feeding sheets forward to the main support for stacking thereon, a carriage, an auxiliary support the rear end of which is mounted on the carriage, means for actuating the carriage horizontally to dispose the auxiliary support above the main support in the path of feed of the sheets in order that the feeding means may feed the sheets to the auxiliary support for stacking on the auxiliary support and for retracting the carriage in order to transfer the stacks of sheets from the auxiliary support to the main support, the auxiliary support having a plurality of upwardly apertured substantially horizontally disposed fingers separated by open spaces between the fingers, and means for directing air under pressure to the apertures in the fingers; first, between the fingers and the sheets initially fed thereto after the carriage has been actuated forward above the main support in order to float the initially fed sheets on the fingers; and later, after a stack of sheets has become formed on the auxiliary support, between the fingers and the bottom sheet of such stack in order to prevent adhesion of the said bottom sheet to the fingers during the transfer of such stack to the main support.

References Cited in the file of this patent

UNITED STATES PATENTS

| | | |
|---|---|---|
| 2,205,767 | Lamb | June 25, 1940 |
| 2,261,972 | Matthews | Nov. 11, 1941 |
| 2,454,762 | Belluche | Nov. 30, 1948 |
| 2,521,075 | Matthews | Sept. 5, 1950 |
| 2,698,176 | Matthews | Dec. 28, 1954 |
| 2,757,929 | Williams | Aug. 7, 1956 |
| 2,769,495 | Pomper et al. | Nov. 6, 1956 |